United States Patent [19]
Moen

[11] 3,726,317
[45] Apr. 10, 1973

[54] BOTTOM OUTLET GROMMET MIXING VALVE

[76] Inventor: Alfred M. Moen, 25 Lakeview Drive, Grafton, Ohio 44044

[22] Filed: May 27, 1971

[21] Appl. No.: 147,357

[52] U.S. Cl. ............137/625.17, 251/51, 251/317, 251/172
[51] Int. Cl. .............................................F16k 11/02
[58] Field of Search................137/625.17, 636.4; 251/148, 151, 152, 314, 316, 317, 51, 52, 172

[56] References Cited

UNITED STATES PATENTS

| | | |
|---|---|---|
| 3,532,123 | 10/1970 | Anthony..........................251/172 X |
| 3,548,875 | 12/1970 | Lagarelli........................137/625.17 |
| 3,428,087 | 2/1969 | Moen..............................137/625.17 |
| 2,710,736 | 6/1955 | Miller................................251/52 X |
| 2,864,580 | 12/1958 | Le Moine............................251/317 |
| R25,920 | 11/1965 | Moen..........................137/625.17 X |
| 3,387,631 | 6/1968 | Pecis..............................137/625.17 |

Primary Examiner—William R. Cline
Attorney—Parker, Plyer & McEachran

[57] ABSTRACT

A single handle mixing faucet comprises a cylindrical housing, a cylindrical sleeve positioned within the housing and a stem reciprocal and rotatable relative to the sleeve. The sleeve discharge port is in its bottom as is the discharge port in the housing. A seal member encloses a portion of the sleeve adjacent the sleeve inlet ports and is in sealing contact with the stem, sleeve and housing. Means are provided within the stem for retarding sudden closure of the stem to prevent "water hammer."

13 Claims, 4 Drawing Figures

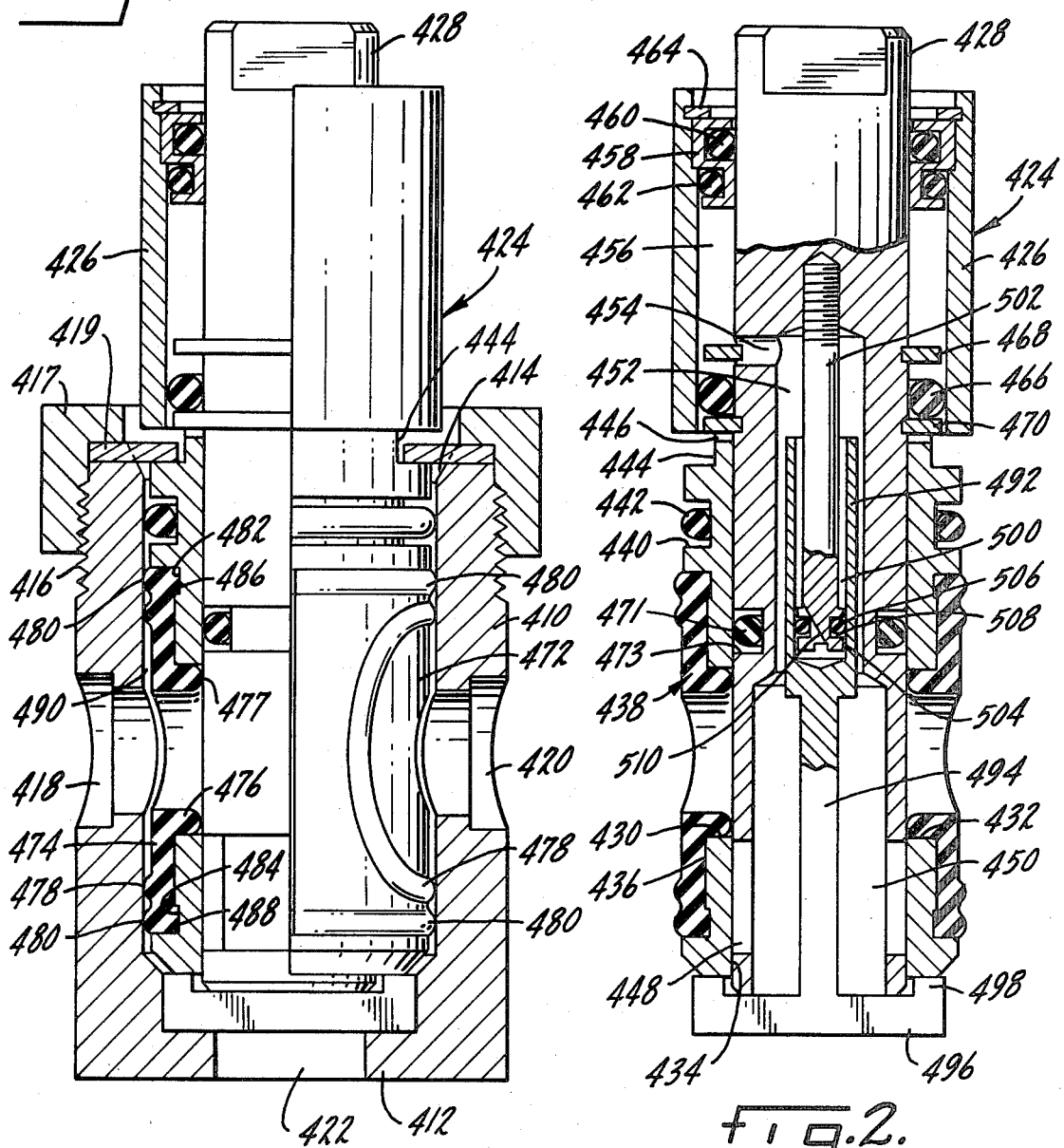

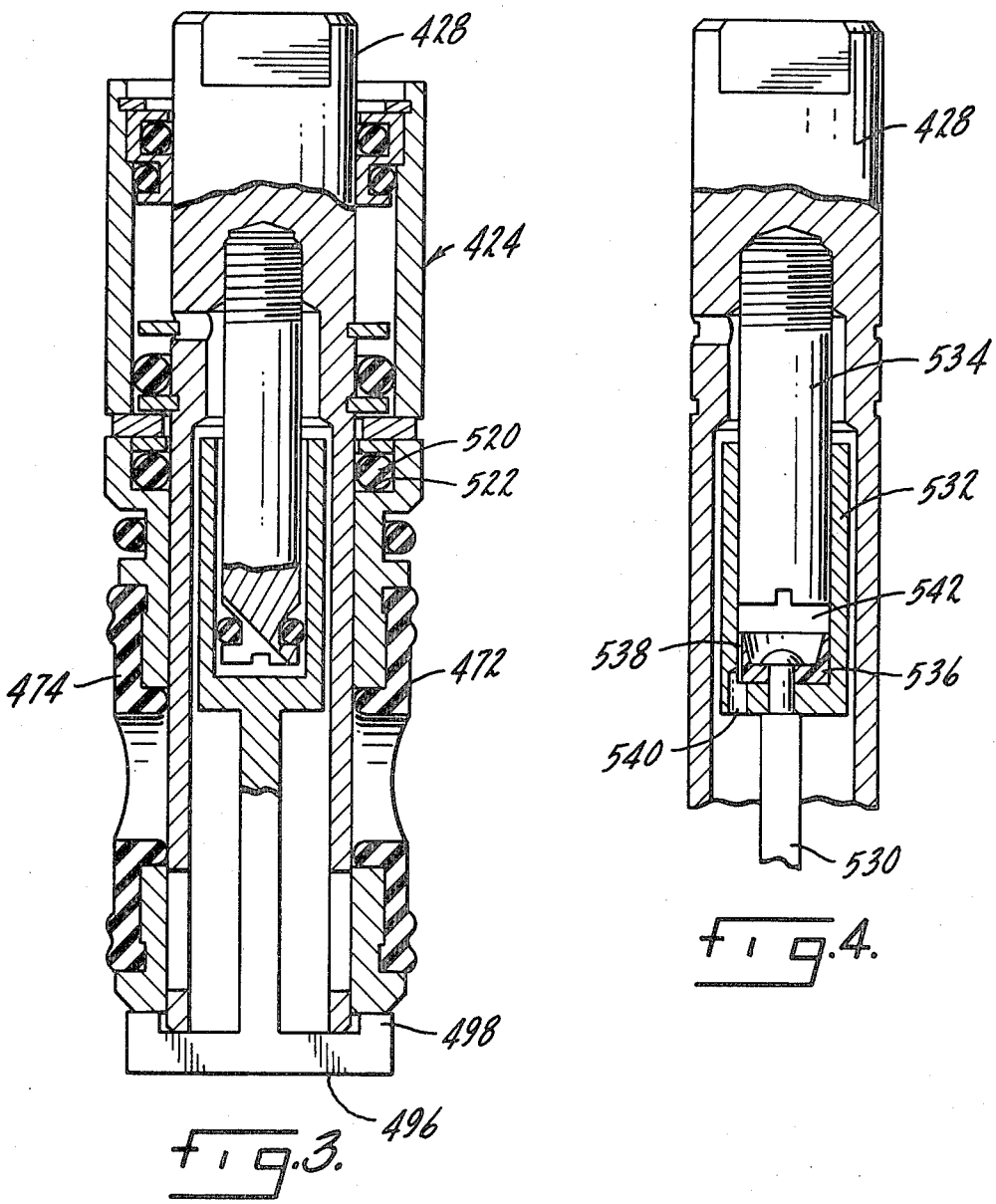

1

BOTTOM OUTLET GROMMET MIXING VALVE

SUMMARY OF THE INVENTION

This invention relates to improvements in single handle mixing faucets and in particular to a mixing faucet having a sleeve and stem combination in which the discharge is at the bottom of the sleeve.

Another purpose is a mixing faucet of the type described including means for preventing "water hammer."

Another purpose is a mixing valve including a sleeve, a stem reciprocal within the sleeve, and a seal member positioned about the sleeve inlet ports and being in sealing contact with the stem and the housing enclosing the stem and sleeve.

Other purposes will appear in the ensuing specification, drawings and claims.

BRIEF DESCRIPTION OF THE DRAWINGS

The invention is illustrated diagrammatically in the following drawings wherein:

FIG. 1 is a partial section through a mixing valve,

FIG. 2 is an axial section through the mixing valve stem and sleeve,

FIG. 3 is an axial section, similar to FIG. 2, showing a modified form of the invention, and FIG. 4 is a partial axial section showing a further modified form of the invention.

DESCRIPTION OF THE PREFERRED EMBODIMENT

In FIGS. 1 and 2 a housing is indicated at 410 and may have a closed bottom 412 and an open end 414. The exterior of the housing is threaded at 416 to receive a retainer nut 417 positioned over a key 419. The key 419 is positioned in a slot 444 and rotationally locates the valve cartridge described herein. A pair of hot and cold water inlet ports 418 and 420 are formed in the side of the housing 410 and there is a discharge port 422 formed in the bottom.

A mixing valve in the form of a valve cartridge is indicated generally at 424 and is positioned within the housing 410 with a portion of the cartridge extending outside of the housing. The cartridge 424 is made up essentially of two elements, an outer sleeve 426 and an inner stem 428 which is reciprocal and rotatable relative to the sleeve to control the volume and temperature of water passing from the housing inlets 418 and 420 through the housing discharge 422. A handle, not shown, may conventionally be attached to the outer end of the stem.

The sleeve 426 includes hot and cold water inlet ports 430 and 432 which are formed in the side of the sleeve and a discharge port 434 which is formed in the bottom in alignment with the housing discharge 422. Water from the inlets will pass inside of the sleeve, into the stem as described hereinafter, and then out of the bottom discharge 434. The exterior of the sleeve 426 may have a recess 436 adjacent the inlet ports and a seal 438 may be positioned within the recess. The recess is circumferential and the seal 438 is generally cylindrical. Above the recess 436 is a groove 440 containing a seal ring 442. The sleeve 426 has a cutaway portion 444 and a passage 446 connecting the stem to atmosphere.

The stem 428 has an open bottom and a water inlet 448 which can be placed into selective communication with the hot and cold water ports 430 and 432. The stem 426 is hollow to form a mixing chamber 450, there being a passage of reduced size 452 above the mixing chamber 450. An opening 454 connects the passage of reduced size 452 with a balance chamber 456 formed between the exterior of the stem 428 and the interior of the sleeve 426. A bracket 458 containing seal rings 460 and 462 seals the upper end of the balance chamber. A snap ring 464 holds the bracket 458 in position between the stem and sleeve. A seal ring 466 seals the lower end of the balance chamber 456 and is held in position by a pair of snap rings 468 and 470.

A seal 471 positioned in a groove 473 forms a seal between the interior of the sleeve and exterior of the stem above seal 438 to prevent water seepage toward opening 446 when the valve is open.

The stem is pressure balanced in that the annular sealing area of O-ring 466 is generally equal to the cross section of the entire stem. Thus equal and oppositely-directed water pressure created forces balance the stem in any open or closed position of the valve.

The seal construction 438 is made up of two substantially identical halves or parts 472 and 474. Each of the halves include a port seal portion 476 which extends inwardly through the hot and cold water ports 430 and 432 and has an inner rim 477 in sealing contact with the exterior of the stem. Each of the seal halves 472 and 474 also have a circular or annular bead 478 which surrounds about the port seal portion with the exterior of the bead being in sealing contact with the interior surface of the housing 410. Opposite ends of the cylindrical halves 472 and 474 have circumferentially extending beads 480 which primarily function to position the beads during insertion and removal. The cylindrical recess in the exterior of the sleeve, indicated at 436, has upper and lower grooves 482 and 484 which receive inwardly-directed mating projections 486 and 488 on the seal halves 472 and 474 to anchor the seal halves to the exterior of the sleeve. Thus, both when the sleeve is inserted into the housing and when it is removed, the seal is firmly anchored onto the exterior of the sleeve and will not bunch up or tear, but will stay in position.

The circular beads 478 are effective to form small pressure chambers 490 about each of the port seal areas 476. The water pressure in chamber 490 assists in forming the seal by creating an inward pressure or force on the port seal portions, thus urging them into sealing contact with the exterior of the stem.

A cup-shaped member indicated at 492 has a downwardly-extending stem 494 connected to a bar 496. The bar extends across the open ends of both the stem and the sleeve and has an upturned portion 498 which is in contact with the lower end of the sleeve. The cup-shaped member 492 is fixed in position relative to the sleeve and the stem may be reciprocated and rotated inside the sleeve without affecting the position of the cup-shaped member. A chamber 500 is formed within the cup-shaped member and receives a shaft 502 extending downwardly from an upper portion of the stem. Near the bottom of the shaft 502 there is an enlarged area 504 and a seal 506 positioned in a groove 508. The seal bears against the interior of the cup-shaped member and thus forms a seal between the shaft and the cup-shaped member. A diagonal slot 510 is formed behind the seal ring 506 and defines a passage of limited extent between the chamber area beneath the enlargement 504 and the upper portion of the chamber 500. When the valve is open water will flow into the chamber 500, through the diagonal groove 510 and into the chamber portion below the enlargement 504. When the valve is closed and the stem is pushed downwardly, it can only be moved downwardly as fast as water can escape through diagonal groove 510 into the upper portion of chamber 500. A rapid closure will tend to expand seal 506 into groove 510 further restricting the passage of water. Thus, the combination of the seal 506 and the diagonal groove 510 provides a retarding force preventing rapid closure of the valve. It has been found in some plumbing systems that a rapid closure of the valve not only can make an undesirable noise known as "water hammer", but if of sufficient force, can at times burst the pipes. The brake or retarding mechanism or damping mechanism shown prevents rapid closure of the stem into the sleeve or rapid closure of the valve.

The valve of FIG. 3 is substantially the same as the of FIGS. 1 and 2 and like parts have the same numbers. Seal 520 positioned in a groove 522 in the interior of the sleeve performs the same function as seal 471 of FIG. 2. It prevents upward seepage of water when the valve is open. The relocation of seal 471 permits the enlargement of the cup-shaped member 492.

In FIG. 4 only the stem is shown in detail as the other portions of the valve may be as shown in FIGS. 1-3. A stem 530 mounts a cup 532, with the stem being fixed to the sleeve, for example in the manner shown in FIG. 3. A shaft 534 extends downwardly from the cartridge stem and has an exterior diameter such as to form a close fit with the interior of the cup 532. A seal 536 is positioned in the bottom of cup 532. There is a notch 538 in seal 536 which is in alignment with a passage 540 in the bottom of the cup 532.

In operation, movement of the stem relative to the sleeve is controlled by the rate of water flow through notch 538 and passage 540. If the stem is closed or moved downward at a rapid rate, water pressure within chamber 542 defined by seal 536 and the bottom of shaft 534 will tend to close notch 538, further restricting the flow of water. Thus, in somewhat the same manner as described before, closing of the stem is controlled to prevent "water hammer."

The valve shown operates in much the same manner as the valve shown in my prior U.S. Pat. No. Re. 25,920. However, in this case the water is discharged out of the bottom of the sleeve and housing rather than through a side port and thus through a spout. The valve shown may have application in the kitchen, in the lavatory or in a shower-tub combination. Of importance is the particular seal shown which, in a unitary construction or a construction made of two substantially identical halves, provides a seal between the exterior of the stem, the exterior of the sleeve and the interior of the housing containing the valve. The water hammer prevention device or the dampening means is also important, as it prohibits rapid closure of the valve which can be both undesirable and at times damaging.

Whereas the preferred form of the invention has been shown and described herein, it should be realized that there may be many modification, substitutions and alterations thereto.

I claim:

1. In a single handle mixing valve, a housing having hot and cold water inlet ports and a discharge port, a sleeve in said housing, said sleeve having an open end forming a water discharge and hot and cold water inlets in the side thereof in communication with said housing inlet ports, a hollow stem within the sleeve, inlet and outlet means in said stem, rotation and reciprocation of said stem relative to said sleeve controlling the relative positions of said sleeve inlet ports and said stem inlet means to regulate the volume and temperature of water passing from said sleeve inlet ports, through said stem, to said sleeve open end, seal means between the stem and sleeve, and a cylindrical seal member positioned about the sleeve adjacent the sleeve inlets and having port seal portions extending through the sleeve inlets and in sealing contact with the stem, said cylindrical seal having a plurality of sections, there being a port seal portion in each section.

2. The structure of claim 1 further characterized by and including an outwardly-extending annular bead at opposite ends of the cylindrical seal.

3. The structure of claim 2 further characterized by and including an annular bead positioned about each of said port seal portions, with said annular beads being in sealing contact with the interior of the housing.

4. The structure of claim 3 further characterized in that said cylindrical seal member is formed of two substantially identical parts, with a port seal portion in each part.

5. The structure of claim 4 further characterized by and including a pair of spaced annular grooves in the exterior of said sleeve, and a pair of inwardly-directed projections adjacent the ends of said seal member cylindrical halves, with said projections fitting within said grooves to anchor said seal parts upon the exterior of said sleeve.

6. The structure of claim 1 further characterized in that said housing is generally cylindrical in form having a closed end, said discharge port being formed within said closed end.

7. The structure of claim 6 further characterized in that a portion of said sleeve and stem extend outside of said housing.

8. The structure of claim 1 further characterized by and including a shaft positioned within the hollow stem, a cup-shaped member enclosing a portion of the shaft and fixed in relation to the sleeve, a seal about said shaft and bearing against the interior of said cup-shaped portion, and a restricted passage in said shaft adjacent said seal.

9. The structure of claim 8 further characterized in that said cup-shaped member has a portion extending outside of said stem and in contact with the sleeve.

10. The structure of claim 1 further characterized by and including a shaft positioned within the hollow stem, a cup-shaped member enclosing a portion of said shaft and fixed in relation to the sleeve, a seal in said cup-shaped member and a restricted water passage between said seal, shaft and cup-shaped member.

11. In a single handle mixing valve, a housing having hot and cold water inlet ports and a discharge port, a sleeve in said housing, said sleeve having an open end forming a water discharge, and hot and cold water inlets in the side thereof in communication with said housing ports, a hollow stem within the sleeve, inlet and outlet means in said stem, rotation and reciprocation of said stem relative to said sleeve controlling the relative positions of said sleeve inlet ports and said stem inlet means to regulate the volume and temperature of water passing from said sleeve inlet ports, through said stem, to said sleeve open end, seal means between the stem and sleeve and between the sleeve and housing, a shaft positioned within the hollow stem, a cup-shaped member fixed relative to the sleeve, positioned within the stem and enclosing a portion of said shaft, said cup-shaped member and shaft defining a chamber, a seal within said chamber, and a restricted passage between said chamber and the interior of said stem, closure of the stem into the sleeve being restricted by the flow of water through said passage.

12. The structure of claim 11 further characterized in that said seal extends about said shaft.

13. The structure of claim 11 further characterized in that said seal is positioned in the bottom of said cup-shaped member.

* * * * *